United States Patent [19]
Satoh

[11] Patent Number: 5,427,447
[45] Date of Patent: Jun. 27, 1995

[54] DRAWER UNIT
[75] Inventor: Tomoaki Satoh, Utsunomiya, Japan
[73] Assignee: Nifco, Inc., Kanagawa, Japan
[21] Appl. No.: 158,209
[22] Filed: Nov. 29, 1993
[30] Foreign Application Priority Data
  Nov. 27, 1992 [JP] Japan .................................. 4-341387
  Oct. 6, 1993 [JP] Japan .................................. 5-275015
[51] Int. Cl.6 ............................................. A47B 88/00
[52] U.S. Cl. ............................. 312/309; 297/188.17; 108/45; 312/330.1; 312/334.46
[58] Field of Search ............... 312/333, 334.44, 334.46, 312/309, 9.63, 9.57, 330.1; 297/194, 188; 108/45, 25

[56] References Cited
U.S. PATENT DOCUMENTS

| | | | |
|---|---|---|---|
| 3,496,887 | 2/1970 | Du Pont | 108/25 |
| 3,606,112 | 9/1971 | Cheshier | 108/45 X |
| 3,899,982 | 8/1975 | Fetzek . | |
| 4,417,764 | 11/1983 | Marcus et al. | 108/44 X |
| 4,582,372 | 4/1986 | Cooper | 108/143 X |
| 4,655,344 | 4/1987 | Ackeret | 312/333 X |
| 4,738,423 | 4/1988 | DiFillippo et al. . | |
| 4,792,174 | 12/1988 | Shioda . | |
| 4,892,281 | 1/1990 | DiFilippo et al. . | |
| 4,953,771 | 9/1990 | Fischer et al. | 108/44 X |
| 4,955,571 | 9/1990 | Lorence et al. . | |
| 4,981,277 | 1/1991 | Elwell . | |
| 5,060,899 | 10/1991 | Lorence et al. | 297/194 X |
| 5,171,061 | 12/1992 | Marcusen | 297/194 |
| 5,232,262 | 8/1993 | Tseng | 297/194 |
| 5,284,314 | 2/1994 | Misaras et al. | 297/194 X |

FOREIGN PATENT DOCUMENTS

| | | |
|---|---|---|
| 63-44844 | 3/1988 | Japan . |
| 63-161045 | 10/1988 | Japan . |
| 336389 | 5/1991 | Japan . |
| 523401 | 6/1993 | Japan . |

Primary Examiner—Kenneth J. Dorner
Assistant Examiner—Janet M. Wilkens
Attorney, Agent, or Firm—Sughrue, Mion, Zinn, Macpeak & Seas

[57] ABSTRACT

A drawer unit which includes a unit body 2 in the form of a parallelepiped box which is open at the front thereof and a drawer member 4 accommodated for drawing out movement in the unit body 2 is constructed such that, when the drawer member 4 is drawn out from the unit body 2, as the drawer member 4 moves forwardly in the unit body 2, a guide projection 47 on the drawer member 4 is slidably moved in a guideway 25 of the unit body 2 such that it is slidably moved laterally sidewardly under the guidance of an oblique portion 25a of the guideway 25.

11 Claims, 8 Drawing Sheets

DRAWER UNIT

BACKGROUND OF THE INVENTION

This invention relates to a drawer unit suitably used as a cup holder or a like apparatus of the drawer type installed in the center console of an automobile.

It is conventionally known to incorporate, as interior equipment of an automobile, a cup holder of the drawer type in the center console of the automobile between the driver's seat and the assistant driver's seat such that a vessel such as a juice can is carried on the cup holder. When the cup holder is not used, it is retracted into the center console so that it may not create an obstacle. Several cup holder units of the drawer type wherein a cup holder is formed in the center console or a like member are disclosed, for example, in Japanese Utility Model Laid-Open Nos. 63-44844 and 63-161045.

Figure 9:
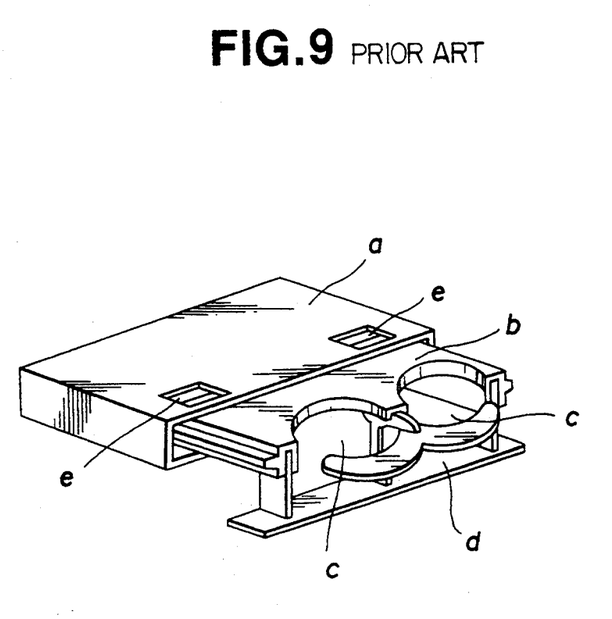
FIG. 9 is a perspective view showing a conventional cup holder unit.

Those cup holder units are constructed such that a holder of the drawer type is drawn out linearly forwardly. In particular, the unit proposed in Japanese Utility Model Laid-Open No. 63-44844 is constructed in such a manner as shown in FIG. 9. Referring to FIG. 9, the cup holder unit shown includes a unit body a in the form of a box which is open at the front thereof, and a holder b accommodated for drawing out movement in the unit body a and having a pair of cup holding holes c formed therein. When the holder b is drawn out from the unit body a, a frame-like end portion of the holder b is pivoted downwardly so that it serves as a stopper d which prevents dropping off of cups received in the cup holding holes c. The cup holder unit is of the type wherein the holder b is drawn out linearly forwardly. Further, other cup holder units conventionally proposed are of the type wherein a holder is drawn out linearly forwardly from a unit body although they may be different in construction of a stopper or some other elements. A pair of arresting holes e are formed in a top wall of the unit body a for engaging with a pair of arresting portions (not shown) formed at base end portions of the holder b to hold the holder b in a drawn out position.

With the cup holder of the unit of the construction described above, however, when incorporated in the center console of an automobile, since the holder b is drawn out linearly forwardly in order to use it, when a cup or a like vessel is received in the holder b drawn out forwardly, the holder b may possibly be an obstacle to and therefore complicate a manual operation of some other equipment installed in the center console such as, for example, an audio apparatus. In this instance, it is dangerous if the driver pays too much attention to such operation. Further, where the cup holder is installed in an automobile which has a comparatively small amount of space, the holder b drawn out by the driver may possibly make an obstacle to an operation of the driver such as a shifting operation of the speed reducing gear or a steering operation of the steering wheel, thus deteriorating the operability in driving of the automobile by the driver.

SUMMARY OF THE INVENTION

It is an object of the present invention to provide a drawer unit which eliminates, when incorporated as a cup holder or a like apparatus in the center console of an automobile, various possible disadvantages arising from the structure wherein a drawer member is drawn out linearly forwardly.

In order to attain the object described above, according to the present invention, there is provided a drawer unit which comprises a unit body in the form of a box being open at the front thereof, and a drawer member accommodated for drawing out movement in the unit body, wherein a guideway having an oblique portion is formed on an inner face of a bottom wall or a top wall of the unit body in such a manner as to extend in a forward and rearward direction. A side portion of the drawer member is cut away so that a rear portion of the drawer member is formed with a reduced width comparing with a front portion of the drawer member while a guide projection is provided on an upper face or a lower face of the rear portion of the drawer member and inserted for sliding movement in the guideway, and when the drawer member is drawn out forwardly farther than a front end face of the unit body, the drawer member protrudes forwardly from the unit body and is slidably moved laterally sidewardly under the guidance of the guide projection by the oblique portion of the guideway.

Preferably, a guide member for supporting a rear end portion of the drawer member for leftward and rightward sliding movement thereon is disposed for forward and rearward movement in the unit body. When the drawer member is drawn out forwardly farther than the front end of the unit body, the guide member moves forwardly together with the drawer member in the unit body and the drawer member is slidable in the leftward or rightward direction along the guide member.

Preferably, the drawer member is removable from the unit body.

The drawer unit may be constructed such that a pair of such guideways are formed on the unit body in such a manner that the oblique portion thereof extends obliquely outwardly away from each other from the rear side to the front side while the drawer member includes two divisional sections, on each of which a guide projection inserted for sliding movement in a corresponding one of the guideways is provided. When the drawer member is drawn out, it protrudes forwardly farther than the front end face of the unit body and the two divisional sections thereof are slidably moved outwardly away from each other.

With the drawer unit of the present invention, the unit body is incorporated in a wall of the center console of an automobile or a like equipment or a base member of various articles. When it is to be used, the drawer member accommodated in the unit body is drawn out forwardly from the front end opening of the unit body so that it is used as a cup holder, a tray, a glove compartment or a like vessel. When it is not used, it is accommodated into the unit body.

In this instance, with the drawer unit of the present invention, when the drawer member is drawn out from the unit body, as the drawer member moves forwardly in the unit body, the guide projection on the drawer member slidably moves in the guideway of the unit body so that the drawer member is slidably moved laterally sidewardly under the guidance of the guide projection by the oblique portion of the guideway. Consequently, the drawer member protrudes forwardly farther than the front end face of the unit body and is slidably moved laterally sidewardly, and is thus drawn out to a position wherein it is displaced laterally sidewardly from the front of the unit body.

Accordingly, with the drawer unit of the present invention, even where it is incorporated in the center console of an automobile and the drawer member thereof is used as a cup holder or a like vessel, if the drawer unit is constructed such that the drawer member is slidably moved laterally sidewardly to the assistant driver's seat side, then the drawer member does not create an obstacle when the driver manually operates some other equipment installed in the center console. Even where the automobile interior is small, the drawer member is not an obstacle for driving of the automobile by the driver. Further, where the automobile interior is large, if the drawer unit is constructed such that the drawer member is slidably moved reversely toward the driver's seat side, the drawer member approaches the driver so that the driver can readily use the drawer member.

Where the rear portion of the drawer member is supported for leftward and rightward sliding movement on the guide member disposed for forward and rearward movement in the unit body, when the guide projection of the drawer member is slidably moved in the leftward or rightward direction under the guidance of the oblique portion of the guideway of the unit body, the leftward or rightward movement of the drawer member is performed stably while it is supported on the guide member. Accordingly, a drawing out operation of the drawer member can be performed smoothly without any play, and high operability is assured.

Where a pair of such guideways are formed on the unit body in such a manner that the oblique portions thereof extend obliquely outwardly away from each other from the rear side to the front side while the drawer member includes two divisional sections on each of which a guide projection inserted for sliding movement in a corresponding one of the guideways is provided, the drawer member can be drawn out while the two divisional sections are slidably moved outwardly away from each other. Accordingly, where the drawer unit is installed in the center console of an automobile of a large interior size, the drawer divisional sections are individually drawn out toward the driver's seat side and the assistant driver's seat side, and consequently, both of the driver and the assistant driver can use the drawer unit readily. In this instance, although it cannot be anticipated particularly that the drawer unit enhances the operability of some other equipment installed in the center console, since the drawer divisional sections are slidably moved leftwardly and rightwardly away from each other, a center location of the drawer unit is opened. This facilitates manual operation of the shift lever located at a central location in the automobile and additionally enhances the visibility of the center console such that it is easy to visually observe a display area of an audio apparatus installed below the drawer unit.

DESCRIPTION OF THE PREFERRED EMBODIMENTS

Referring first to FIGS. 1 to 6, there is shown a drawer unit according to a first preferred embodiment of the present invention. The drawer unit shown is generally denoted at 1 and includes a unit body 2 in the form of a thin parallelepiped box which is open at the front thereof, a drawer member 4 accommodated for forward and backward movement in the unit body 2, and a guide member 6 interconnecting the unit body 2 and the drawer member 6.

Figure 1:
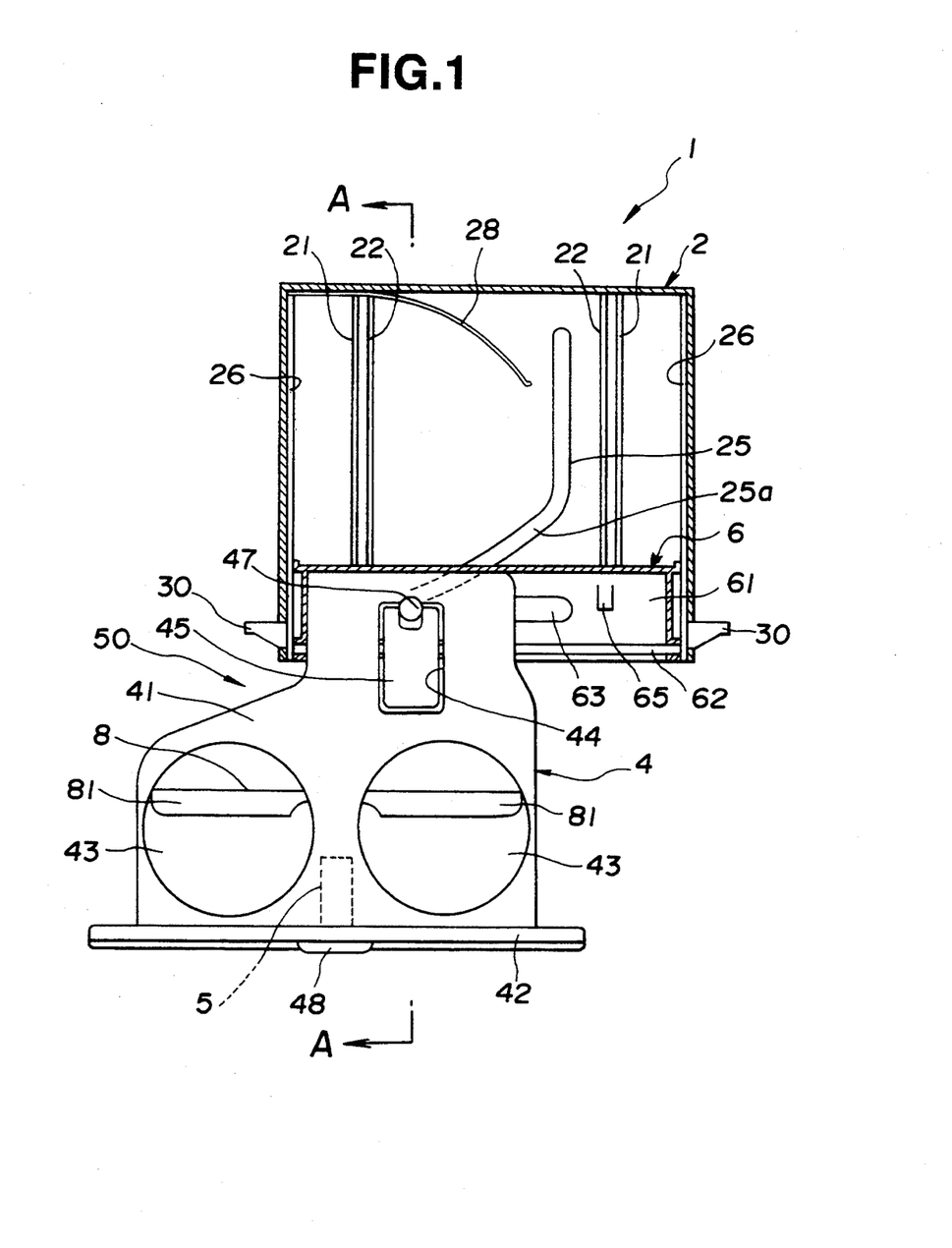
FIG. 1 is a top plan view, partly in section, of a drawer unit according to a preferred embodiment of the present invention showing a drawer member in a drawn out position with an upper wall of a unit body removed.
Figure 2:
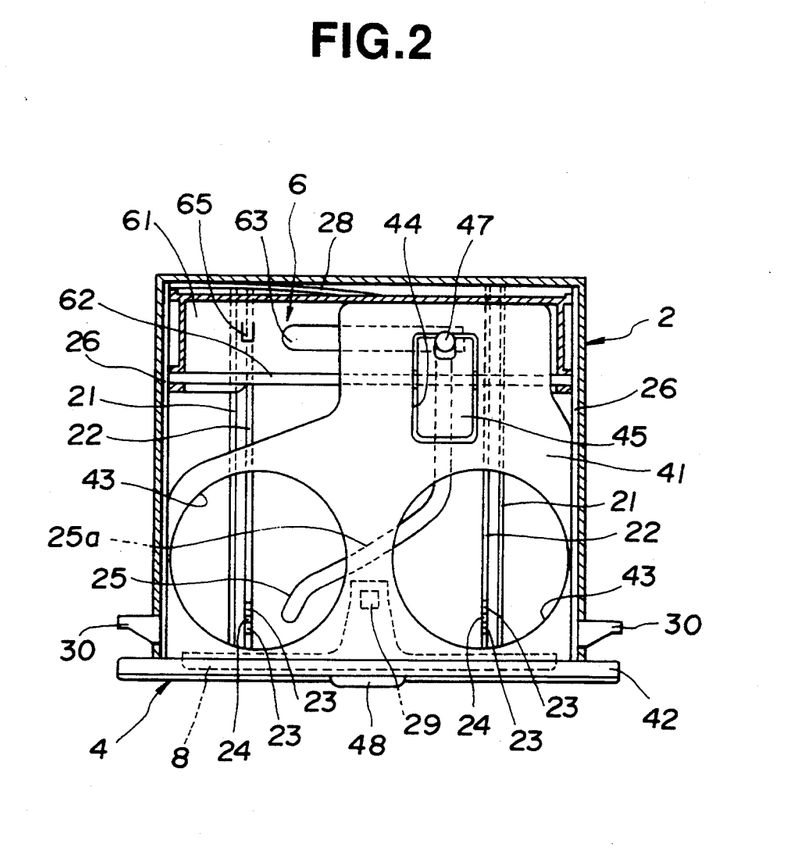
FIG. 2 is a top plan view, partly in section, of the drawer unit of FIG. 1 but showing the drawer member retracted in the unit body with the upper wall of the unit body removed.

As particularly seen from FIGS. 1 and 2, a pair of rail recesses 21 are formed at left and right locations of an inner face of a bottom wall of the unit body 2 and extend in parallel in the forward and backward direction, that is, shown in the upward and downward direction in FIGS. 1 and 2. A pair of projection receiving recesses 22 are formed at locations of the inner face of the bottom wall of the unit body 2 inwardly and in the proximity of the rail recesses 21 and extend in parallel in the forward and backward direction. A pair of protrusions 23 (FIG. 2) are formed at forward portions of each of the projection receiving recesses 22 such that they protrude upwardly with a suitable taper, and an arresting recess 24 is defined between the protrusions 23 and adapted to engage an arresting projection of a guide member 6 which will be hereinafter described.

Figure 3A:
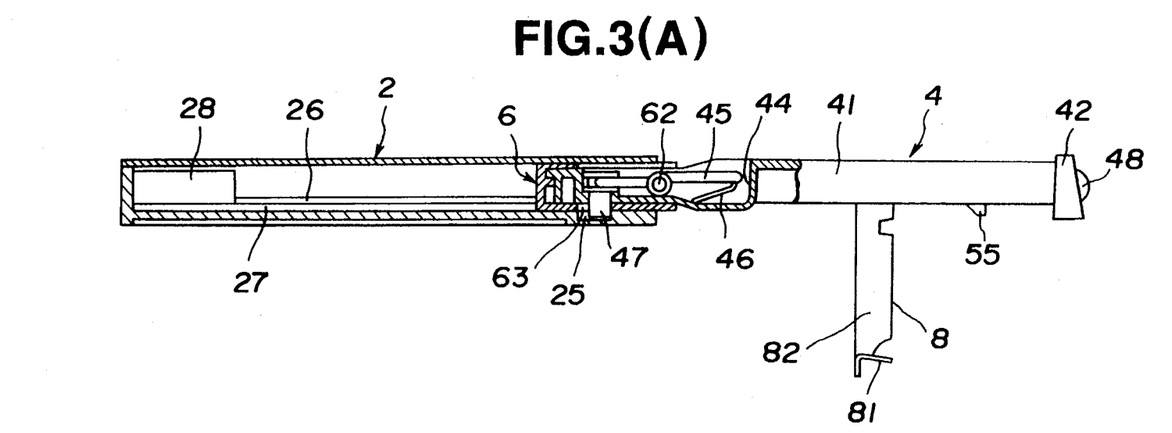
FIG. 3(A) is a sectional view taken along line A—A of FIG. 1 showing the drawer member of the drawer unit in the drawn out position when a disconnection member is at a normal position.

A guideway 25 is formed on the inner face of the bottom wall of the unit body 2 between the projection receiving recesses 22 and extends generally in the forward and backward direction. The guideway 25 has an oblique portion 25a which extends obliquely laterally from an intermediate portion to a front end portion thereof. A pair of ribs 26 are formed on the inner faces of the opposite side walls of the unit body 2 in a vertically spaced relationship by a predetermined distance from the inner face of the bottom wall of the unit body 2 and extend in parallel in the forward and backward direction such that a pair of rail grooves 27 are defined between the ribs 26 and the inner face of the bottom wall as seen in FIG. 3. A leaf spring 28 is disposed on and secured to a side portion of the inner face of the rear wall of the unit body 2 such that a free end portion thereof is curved forwardly as seen in FIG. 1. Further, a locking recess 29 is formed at a front end portion of the inner face of the bottom wall of the unit body 2 at a central location in the leftward and rightward direction and adapted to engage a locking pawl 55 of a locking member 5 which will be hereinafter described. A pair of mounting tabs 30 are formed at front portions of the opposite side walls of the unit body 2 and have threaded holes 31 perforated therein so that the drawer unit 1 may be secured to the center console of an automobile by means of fastening screws (not shown) threaded through the threaded holes 31.

The drawer member 4 includes a drawer body 41 in the form of a substantially rectangular plate which is partially cut away at a leftward rear portion thereof (portion indicated at 50 in FIG. 1) such that a rear portion thereof is reduced in width compared to a front portion thereof as seen in FIG. 1. The drawer member 4 further includes a lid member 42 in the form of an elongated plate formed integrally at the front end of the drawer body 41. The opposite left and right end portions of the lid member 42 protrude outwardly from the opposite sides of the front end of the drawer body 41 so that the lid member 42 may fully close the front end opening of the unit body 2 when the drawer member 4 is accommodated in the unit body 2.

Figure 3B:
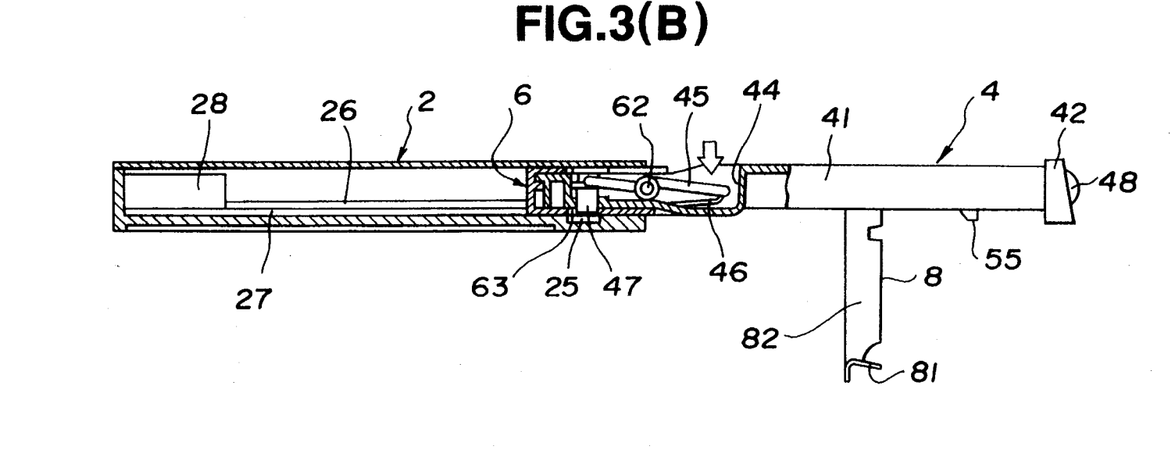
FIG. 3(B) is a similar view but showing the drawer unit when the disconnection member is depressed.
Figure 4:
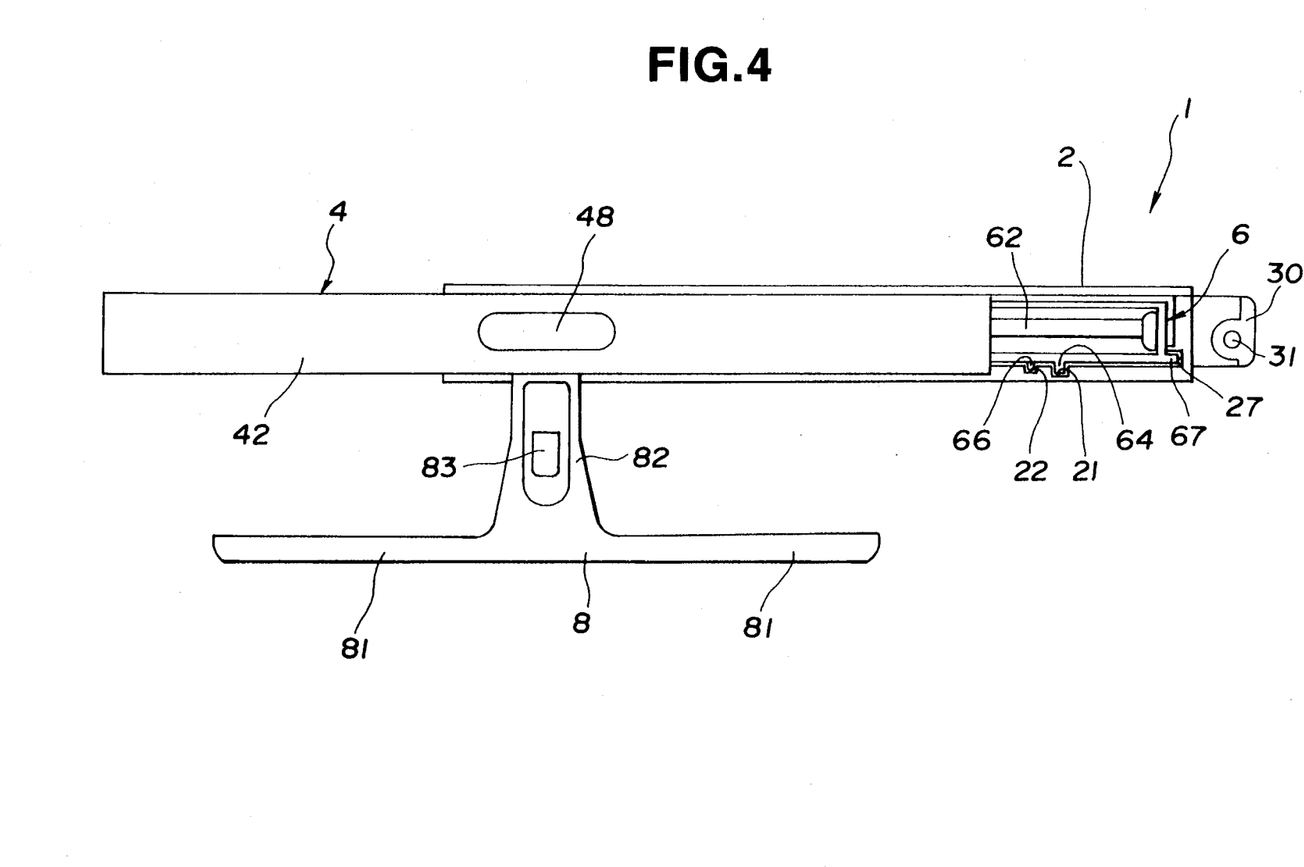
FIG. 4 is a front elevational view of the drawer unit of FIG. 1 showing the drawer member in the drawn out position.

A pair of cup receiving holes 43 are formed in a leftwardly and rightwardly juxtaposed relationship in front portions of the drawer body 41 of the drawer member 4. A disconnection member 45 in the form of a plate is disposed in a recess 44 formed on the upper face of a rear portion of the drawer body 41 such that it can be rocked like a seesaw around a guide bar 62 of the guide member 6 which will be hereinafter described. A resilient member 46 is interposed between the inner face of a front end portion of the disconnection member 45 and the drawer body 41 and normally biases the disconnection member 45 so that the front end side of the disconnection member 45 may be pivoted upwardly while the rear end side is pivoted downwardly. A guide projection 47 in the form of a round column is mounted at a rear end portion of the disconnection member 45. The guide projection 47 is normally positioned at a position pushed down by a rear end portion of the disconnection member 45 under the biasing force of the resilient member 46 such that a lower end portion thereof protrudes below the lower face of the drawer body 41 as seen in FIG. 3(A). However, when the disconnection member 45 is depressed at a front end portion thereof against the biasing force of the resilient member 46, the rear end portion of the disconnection member 46 pulls up the guide projection 47 so that the lower end of the guide projection 47 is retracted into the drawing body 41 as seen in FIG. 3(B).

A through-hole is perforated at a central portion of the lid member 42 of the drawer member 4, and an unlocking button 48 is disposed in the through-hole such that it operates the locking member 5 disposed below a front portion of the lower face of the drawer body 41.

Figure 5A:
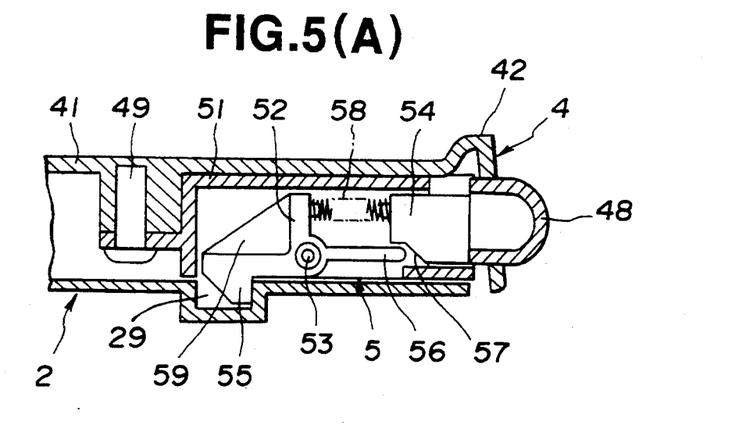
FIG. 5(A) and 5(B) are sectional views showing a locking member of the drawer unit of FIG. 1.
Figure 5B:
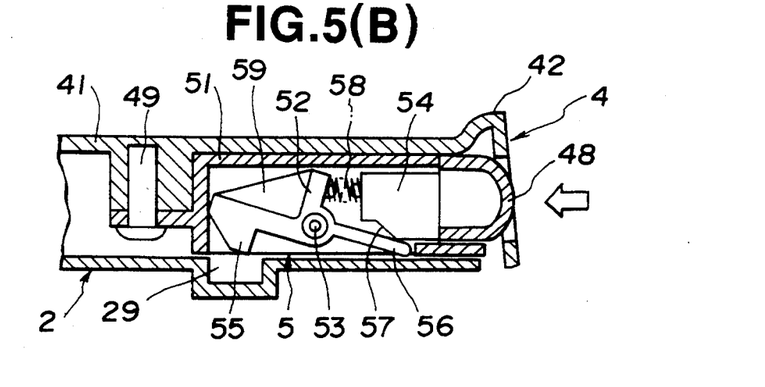

Referring particularly to FIGS. 5(A) and 5(B), the locking member 5 is securely mounted on the lower face of the drawer body 41 by means of a screw 49 and includes a locking member body 51 in the form of a parallelepiped box which is open at the front and a rear portion of the bottom thereof. The locking member 5 further includes an arresting member 52 having a substantially L-shaped section and is supported for rocking motion like a seesaw around a shaft 53. The locking member 5 further includes a pressing member 54 in the form of a parallelepiped block disposed in front of the arresting member 52 for forward and rearward sliding movement in the locking member body 51. The arresting member 52 has a locking pawl 55 formed on the lower face of an end of a major portion thereof. The locking pawl 55 extends downwardly through an opening portion at a rear end portion of the bottom wall of the locking member body 51. The arresting member 52 further has an action finger 56 formed integrally at an L-shaped bent portion thereof such that it extends outwardly forwardly. Meanwhile, the pressing member 54 is cut obliquely at a lower end edge portion of a rear portion thereof to define a tapered action portion 57. The action finger 56 of the arresting member 52 is positioned rearwardly of the action portion 57 of the pressing member 54. A coil spring 58 is disposed between the outer face of an upper portion of a minor portion of the arresting member 52 and an upper portion of the rear end face of the pressing member 54 with the opposite ends thereof supported at projections formed on them. The coil spring 58 normally biases the arresting member 52 in a direction to protrude the locking pawl 55 thereof downwardly and biases the pressing member 54 forwardly. The front end face of the pressing member 54 is normally held in contact with the rear end of the unlocking button 48. It is to be noted that reference numeral 59 denotes a reinforcing rib formed on an inner face of the L-shaped bent portion of the arresting member 52.

The locking member 5 is normally positioned such that, as shown in FIG. 5(A), the locking pawl 55 of the arresting member 52 protrudes downwardly below the lower face of the locking member body 51 under the biasing force of the coil spring 58. The pressing member 54 is positioned at the front end of the locking member body 51. The locking member 5 is positioned to be operated from the surface of the lid member 42 of the drawer member 4 by the unlocking button 48 as described above. Thus, if the unlocking button 48 is depressed, then the pressing member 54 is moved rearwardly against the biasing force of the coil spring 58 as seen in FIG. 5(B), whereupon the end portion of the action finger 56 of the arresting member 52 is pushed downwardly by the tapered action portion 57 of the pressing member 54. Consequently, the arresting member 52 is pivoted in the clockwise direction illustrated in FIG. 5(B) against the biasing force of the coil spring 58 to retract the locking pawl 55 thereof into the locking member body 51. Then, if, in this condition, the depressed condition of the unlocking button is cancelled, the arresting member 52 is pivoted in the counterclockwise direction in FIG. 5(B) while the pressing member 54 is moved downwardly by the biasing force of the coil spring 58. Consequently, also the unlocking button 48 is moved forwardly, thereby to restore the initial condition shown in FIG. 5(A).

A stopper 8 in the form of a T-shaped bar is mounted for pivotal motion on the lower face of the drawer member 4. When the stopper 8 is pivoted forwardly, it is accommodated into a space below the lower face of the drawer body 41 to a rearward pivotal limit position in which a pair of horizontal bar segments 81 are positioned just below the cut receiving holes 43 as seen in FIG. 1. A locking pawl fitting hole 83 is perforated at a central portion of a vertical bar segment 82 of the stopper 8 such that, when the stopper 8 is accommodated into the space below the lower face of the drawer body 41, the locking pawl 5 of the locking member 5 may protrude downwardly below the lower face of the drawer body 41 through the locking pawl fitting hole 83.

Referring particularly to FIGS. 1 to 3, the guide member 6 includes a guide member body 61 in the form of a substantially horizontally elongated box which is open at the front and a front portion of the top wall thereof, and a guide bar 62 in the form of a round bar extending between front end portions of the opposite side walls of the guide member body 61.

Figure 6:
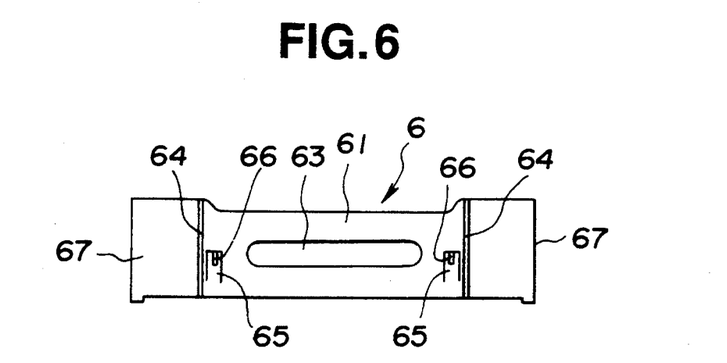
FIG. 6 is a bottom plan view showing a guide member of the drawer unit of FIG. 1.

Referring now to FIG. 6, a guide projection fitting hole 63 is perforated at a central portion of the bottom wall of the guide member body 61 constituting the guide member 6 and extends in the leftward and rightward direction. A pair of first rail projection 64 are formed on the opposite side portions of the lower face of the bottom wall of the guide member body 61 and extend in parallel in the forward and backward direction. A pair of channel-shaped slits are perforated in the bottom wall of the guide member body 61 inwardly of the first rail projections 64 and define therein a pair of resilient tabs 65. Each of the resilient tabs 65 has an arcuate arresting projection 66 formed downwardly on a lower face thereof. The opposite end edge portions of the bottom wall of the guide member body 61 extend outwardly farther than the outer faces of the opposite side walls of the guide member body 61 to form a pair of second rail projections 67 extending in the forward and rearward direction.

The drawer unit 1 of the present embodiment is thus formed by interconnecting the unit body 2 and the drawer member 4 by way of the guide member 6. In particular, the guide member 6 is accommodated for forward and rearward movement in the unit body 2. Here, as particularly seen in FIG. 4, the first rail projections 64, the arresting projections 66 and the second rail projections 67 are fitted for sliding movement in the rail recesses 21, the projection receiving recesses 22 and the rail grooves 27 of the unit body 2, respectively, so that the guide member 6 may move linearly in the forward and rearward directions in the unit body 2 under the guidance of them.

A rear end portion of the drawer body 41 is inserted in the hollow of the guide member body 61, and the guide bar 62 extends for leftward and rightward sliding movement through a rear end portion of the drawer boy 41 so that the drawer member 4 is mounted for leftward and rightward movement on the guide member 6. Consequently, the drawer member 4 is connected for forward and rearward movement and also for leftward and right movement in the unit body 2 by way of the guide member 6. In this instance, a lower end portion of the guide projection 47 of the drawer member 4 extends through the guide projection receiving groove 63 of the guide member 6 into the guideway 25 of the unit body 2 as seen from FIG. 3(A).

The operation of the drawer unit 1 will now be described.

The unit body 2 of the drawer unit 1 is incorporated in the center console of an automobile and secured by means of fastening screws threaded through the mounting tags 30 formed on the opposite side faces of the unit body 2 so that it is used as a cup holder.

In this instance, in a normal condition, that is, when not used, the guide member 6 is positioned at a rear end location in the unit body 2 and the drawer body 41 of the drawer member 4 is accommodated fully in the unit body 2 while the front end opening of the unit body 2 is closed fully with the lid member 42 of the drawer member 4 as seen in FIG. 2. In this condition, the free end portion of the leaf spring 28 in the unit body 2 is kept pressed rearwardly by the rear face of the guide member 6 against the biasing force of the leaf spring 28, and consequently, the guide member 6 and the drawer member 4 are acted upon by the forwardly biasing force. Further, as shown in FIG. 5(A), the locking pawl 55 of the locking member 5 mounted on the drawer member 4 engaged with the locking recess 29 of the unit body 2 to hold the guide member 6 at the rear end portion of the unit body 2 and hold the drawer member 4 in the unit body 2 against the biasing force of the leaf spring 28.

When the drawer member 4 is to be drawn out from the retracted position of FIG. 2 in order to use it as a cup holder, the unlocking button 48 provided on the lid member 42 of the drawer member 4 will be depressed. Thereupon, as can be seen from FIG. 5(B), the unlocking button 48 moves the pressing member 54 of the locking member 5 rearwardly against the biasing force of the coil spring 58, whereupon the tapered action portion 57 of the pressing member 54 pushes the end of the action finger 56 of the arresting member 52 downwardly while a reaction then moves the locking pawl 55 upwardly against the biasing force of the coil spring 58 into the inside of the locking member 5 to cancel the engagement between the locking pawl 55 and the locking recess 29 of the unit body.

Consequently, the guide member 6 is moved forwardly in the unit body 2 by the biasing force of the leaf spring 28. The drawer member 4 is moved forwardly together with the guide member 6 until a front end portion thereof protrudes by a predetermined distance farther than the front end opening of the unit body 2.

Subsequently, if the protruding end portion of the drawer member 4 is grasped and pulled forwardly, then the drawer member 4 is drawn outwardly from the unit body 2 while the guide member 6 is moved forwardly in the unit body 2. Thereupon, the guide projection 47 of the drawer member 4 moves forwardly in the guideway 25 from the rear end of the unit body 2. When the guide projection 47 slidably moves in the oblique portion 25a of the guideway 25, it is guided laterally sidewardly. Consequently, the drawer member 4 is drawn outwardly while it is slidably moved laterally sidewardly along the guide bar 62 of the guide member 6.

Then, as seen in FIG. 1, the movement of the drawer member 4 and the guide member 6 is stopped when the guide projection 47 is abutted with the front end of the guideway 25. In this instance, a side portion of a rear end portion of the drawer body 41 is contacted with the corresponding side wall (left side wall in FIG. 1) of the guide member 6. Thus, the drawer member 4 is drawn out in a laterally sidewardly displaced condition (refer to FIGS. 1 and 4). Further, during such movement of the guide member 6, the engaging projections 66 (refer to FIG. 6) of the resilient tabs 65 of the guide member 6 ride over, as the resilient tabs 65 are resiliently deformed, the rearward protrusions 23 formed at the front portions of the projection receiving recesses 22 of the unit body 2 so that the drawer member 4 is thereafter held in a protruding condition from the unit body 2. Further, when the drawer member 4 is drawn out from the unit body 2, the stopper 81, which has been accommodated in the space below the lower face of the drawer member 4, is pivoted rearwardly by its own weight until the two horizontal bar sections 81 are positioned below the cup receiving holes 43 of the drawer body 4 (refer to FIGS. 1, 3 and 4). It is to be noted that, since the depressed condition of the unlocking button 48 is cancelled then, the locking pawl 55 (refer to FIG. 5) of the locking member 5 is returned by the biasing force of the coil spring 58 to its initial position in which it protrudes farther than the lower face of the drawer body 41 as seen in FIG. 3.

Here, the amount of the lateral sideward sliding movement of the drawer member 4 can be adjusted suitably by adjusting the angle and the length of the oblique portion 25a relative to the remaining portion of the guideway 25 and by adjusting the magnitude of the cut away portion 50 at the side portion of the drawer body 41 accordingly.

The drawer unit 1 of the present embodiment is used in this condition as a cup holder such that juice cans or the like are received in the cup receiving holes 43 of the drawer member 4 and supported by the horizontal bar segments 81 of the stopper 8 so that they may not be dropped off. In this instance, with the drawer unit 1 of the present embodiment, since the drawer body 4 is slidably moved laterally sidewardly toward the left the drawer body 4 will not create an obstacle when the driver seated on the driver's seat to the right tries to operate some other apparatus installed on the center console of the automobile. Even where the automobile is small in interior size, the drawer member 4 will not make an obstacle to driving of the driver. Meanwhile, where the automobile is large in interior size, the drawer unit 1 may be modified such that the drawer member 4 is slidably moved laterally sidewardly toward the driver's seat to approach the driver in order to facilitate use of the drawer member 4 by the driver.

In order to accommodate the drawer member 4 into the unit body 2 after use, the drawer member 4 will be manually pushed to enter the unit body 2. Consequently, the engagement between the arresting projections 66 (refer to FIG. 6) of the guide member 6 and the arresting recesses 24 of the unit body 2 is cancelled deforming the resilient tabs 65 (refer to FIG. 6), and the drawer member 4 is pushed into the unit body 2 while the guide member 6 is moved rearwardly together with the drawer member 4 in the unit body 2.

Thereupon, the guide projection 47 of the drawer member 4 is slidably moved rearwardly in the guideway 25 of the unit body 2, whereupon it is guided laterally sidewardly in the reverse direction (in the rightward direction in FIGS. 1 and 2) by the oblique portion 25a of the guideway 25. Consequently, the drawer member 4 is moved rearwardly in the unit body 2 while it is slidably moved laterally sidewardly in the reverse direction along the guide bar 62 of the guide member 6. Finally, the drawer body 41 of the drawer member 4 is accommodated into the unit body 2 and the front opening of the unit body 2 is closed by the lid member 42. Further, when the guide member 6 is moved to the rear end in the unit body 2, the rear end face of the guide member 6 is contacted with the free end portion of the leaf spring 28 and pushes it rearwardly against the biasing force of it (refer to FIG. 1).

Further, when the drawer body 41 is pushed into the unit body 2, the tapered portion (refer to FIG. 5) of the locking pawl 55 of the locking member 5 provided on the drawer body 41 is contacted with and pushed by a front end edge of the bottom wall of the unit body 2 so that the locking pawl 55 is retracted against the biasing force of the coil spring 58. Then, at a point of time when the drawer body 41 is accommodated fully into the unit body 2, the locking pawl 55 reaches the arresting recess 29 of the unit body 2, and thereupon, the locking pawl 55 is caused to protrude into engagement with the arresting recess 29 by the biasing force of the coil spring 58. Consequently, the drawer member 4 is locked in a condition wherein it is accommodated in the unit body 2, which is the retracted condition shown in FIG. 2. Further, in this instance, when the drawer member 4 is pushed into the unit body 2, the stopper 8 is contacted with and pushed forwardly by the front end of the unit body 2, whereupon the stopper 8 is pivoted forwardly so that it is accommodated into the space below the lower face of the drawer body 41. In this condition, the drawer body 4 is accommodated in the unit body 2.

Here, with the drawer unit of the present embodiment, when the projection 47 of the drawer member 4 is slidably moved leftwardly or rightwardly under the guidance of the oblique portion 25a of the guideway 25 of the unit body 2, the drawer member 4 is moved stably while it is supported on the guide bar 62 of the guide member 6. Accordingly, drawing out and accommodating operations of the drawer member 4 can be performed smoothly without any play, and accordingly, the drawer unit is superior in operability.

Further, with the drawer unit 1 of the present embodiment, if the drawer member 4 is drawn out from the unit body 2 as described above and then, in this condition, the front end of the disconnection member 45 is pushed to raise and remove the guide projection 47 from the guideway 25 of the unit body 2, whereafter the drawer member 4 is drawn out from the unit body 2, then the drawer member 4 can be removed together with the guide member 6 from the unit body 2. This is convenient for cleaning and maintenance of the drawer member 4 and the guide member 6. Further, it is also possible to incorporate, in the unit body 2 incorporated in the center console of an automobile, some other drawer having a connection structure similar to that of the drawer member 4 and the guide member 6 to change the application of the drawer unit when necessary..

Further, in order to mount the drawer member 4 and the guide member 6 thus removed onto the unit body 2, if a tapered face (not shown) is formed on one or each of the opposite side portions of the front end of the inner face of the bottom wall of the unit body 2, then only by pushing the drawer member 4 and the guide member 6 into the unit body 2 while the drawer member 4 are positioned to the left end or the right end of the guide member 6, the guide projection 47 is raised by the tapered face. Then, when the drawer member 4 and the guide member 6 are further pushed into the unit body 2, the guide projection 47 returns to its original condition above the guideway 25 so that it is engaged with the guideway 25, thereby to mount the drawer member 4 and the guide member 6 onto the unit member 2. In short, upon mounting, the disconnection member 45 need not be operated, and the drawer member 4 and the guide member 6 can be mounted readily only by pushing the drawer member 4 and the guide member 6 into the unit body 2.

Figure 7:
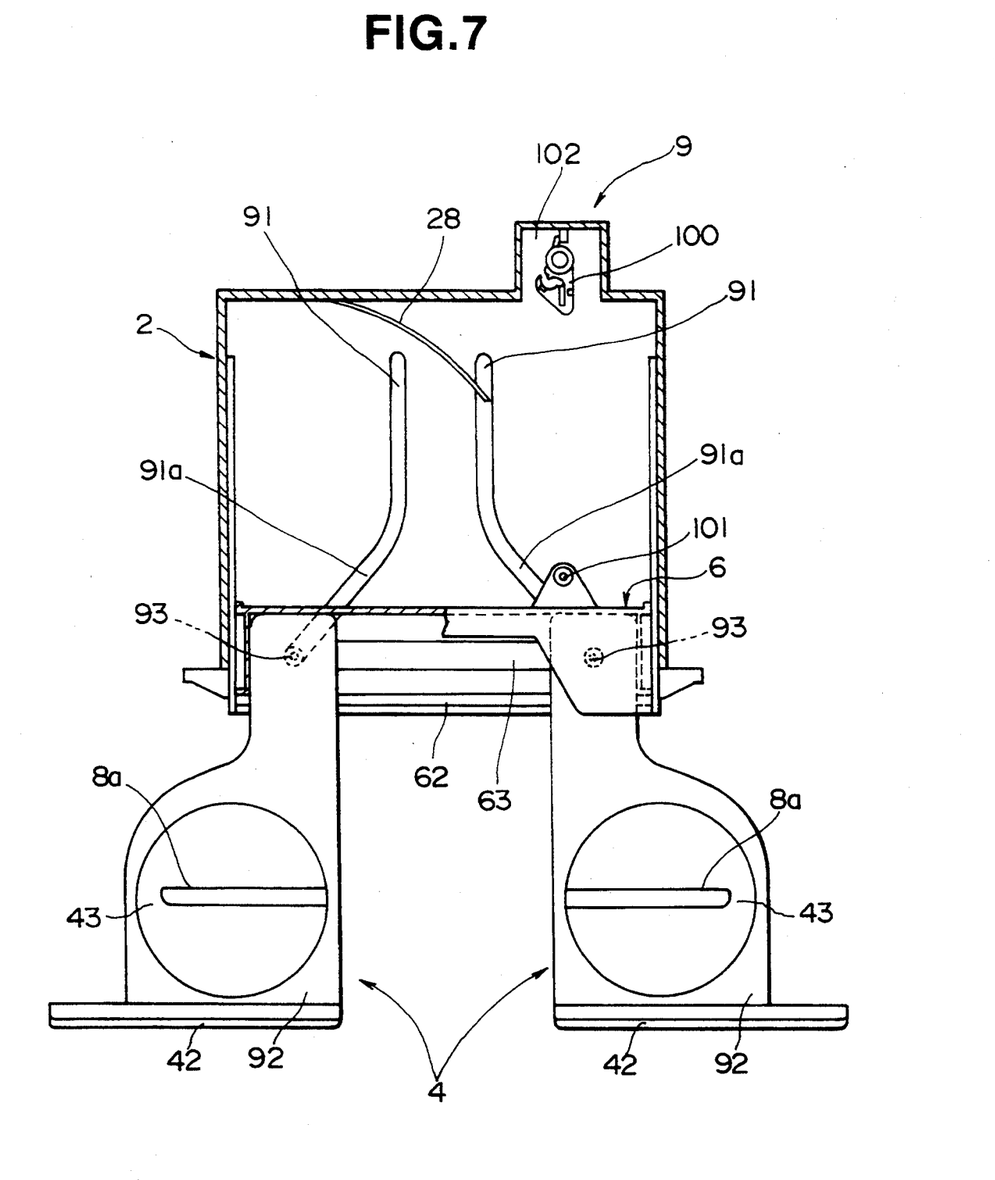
FIG. 7 is a top plan view, partly in section, of another drawer unit according to another preferred embodiment of the present invention showing a drawer member in a drawn out position with an upper wall of a unit body removed.
Figure 8:
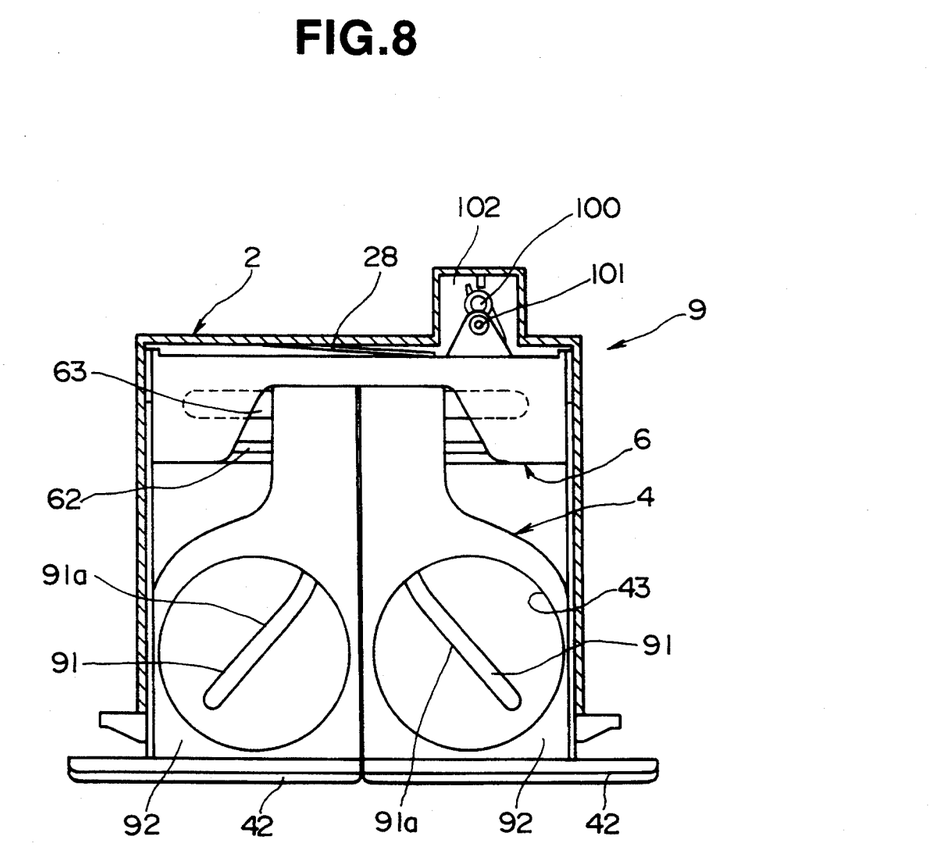
FIG. 8 is a top plan view, partly in section, of the drawer unit of FIG. 7 but showing the drawer member accommodated in the unit body with the upper wall of the unit body removed.

FIGS. 7 and 8 show a drawer unit 9 according to a second preferred embodiment of the present invention. The drawer unit 9 of the present embodiment is a modification to and includes several common components with the drawer unit 1 of the first embodiment. Like elements are denoted by like reference numerals to those of the first preferred embodiment an overlapping description thereof is omitted herein to avoid redundancy. The drawer unit 9 of the present embodiment is generally constructed such that the drawer member 4 is divided into a pair of left and right drawer member divisional sections 92, which are slidably movable in the opposite outward directions to each other.

In particular, the drawer unit 9 includes a unit body 2 having a pair of guideways 91 formed thereon such that oblique portions 91a thereof extend gradually outwardly away from each other from the rear side to the front side. Meanwhile, the drawer member 4 is divided leftwardly and rightwardly into a pair of drawer member divisional sections 92, and a guide projection 93 is formed on the lower face at a rear end portion of each of the drawer member divisional sections 92 and is fitted for sliding movement in the corresponding guideway 91.

Further, in this embodiment drawer unit 9, a mechanism of the push open/push locking type employing a cam-type latch 100 is employed as a locking mechanism for the drawer member 4. In particular, a latch accommodation chamber 102 is provided at a side portion of a rear end portion of the unit body 2, and the known cam-type latch 100 (refer to Japanese Patent Publication No. Hei 3-36389) is disposed in the latch accommodation chamber 102. A latch pin 101 is provided at a rear end portion of the guide member 6 and is engaged with the cam-type latch 100 to lock the drawer member 4 in the unit body 2. In this instance, when the drawer member 4 is pushed from its drawn out position (FIG. 7) into the unit body 2, the latch pitch 101 is engaged with the cam-type latch 100 to lock the drawer member 4. Then when the drawer member 4 is pushed again in this condition (FIG. 8), the engagement between the latch pin 101 and the cam-type latch 100 is automatically cancelled (refer to Japanese Patent Publication No. 3-36389). Further, in the present drawer unit 9, a pair of L-shaped stoppers 8a are individually provided on the drawer member divisional sections 92 similarly to the stopper 8 of the drawer unit of the first embodiment.

With the drawer unit 9 of the present embodiment, if the drawer member 4 is pushed in such a manner as described above to cancel the locked condition and then drawn out similarly as with the drawer unit 1 of the first embodiment, then the drawer member divisional sections 92 are individually slidably moved laterally outwardly under the guidance of the oblique portions 91a of the guideways 91. They are drawn out to individual positions displaced laterally sidewardly from the front of the unit body 2.

With the drawer unit 9, installed in the center console of an automobile particularly of a large interior size, the drawer member sections 92 are individually drawn out toward the driver's seat side and the assistant driver's seat side. Consequently, both of the driver and the assistant driver can use the drawer unit 9 readily. In this instance, although it cannot be anticipated particularly that the drawer unit 9 enhances the operability of some other equipment installed in the center console like the drawer unit 1 of the first preferred embodiment described above, since the drawer member sections 92 are slidably moved leftwardly and rightwardly away from each other, a central location of the drawer unit 9 is opened. This in turn facilitates manual operation of the shift lever located at a central location of the automobile and enhances the visibility of the center console such that it is easy to visually observe a display area of an audio apparatus installed below the drawer unit 9. It is to be noted that the drawer unit 9 further exhibits several advantages which are similar to those of the drawer unit 1 of the first embodiment described above, but overlapping description of such advantages is omitted to avoid redundancy.

While the preferred embodiments of the present embodiment are described above, the drawer unit of the present invention is not limited to the specific embodiments. For example, the guide member 6 is not necessarily essential and may be omitted. Also the shapes of the components and the other constructions including the connection structure, the locking mechanism and so forth can be modified and altered without departing from the spirit and scope of the present invention. Further, while the drawer unit of the present invention is suitably used as a cup holder or a tray of the drawer type which is installed in the center console of an automobile, the application thereof is not limited to automobiles, and the drawer unit can be used for various application such that an accommodating section of the drawer type is formed in various accommodating cases or a tray or an accommodating section of the drawer type is constructed on a wall of various apparatus other than automobiles.

As described so far, with the drawer unit of the present invention, a drawer member can be drawn out while being slidably moved in a lateral leftward or rightward direction, and where the drawer unit is incorporated as a cup holder or some other apparatus in the center console of an automobile, various disadvantages which may be caused otherwise when the drawer member is drawn out linearly can be eliminated.

I claim:

1. A drawer unit installable in a vehicle comprising:
   a unit body in the form of a box open at a front end face thereof,
   a drawer member accommodated for forward and backward movement in said unit body;
   a guideway formed on an inner horizontal wall surface of said unit body extending in a forward and rearward direction, said guideway having an oblique portion which extends obliquely laterally from an intermediate portion to a front end portion thereof, said drawer member being cut away at a side of its rear portion so that its rear portion is formed with a reduced width compared to its front portion, and said drawer member having a guide projection provided on a horizontal surface of said rear portion of said drawer member which is insertable for sliding movement in said guideway, and
   wherein when said drawer member is moved forwardly said drawer member is drawn out from said front end face of said unit body, said drawer member protrudes forwardly from said front end opening face of said unit body and is slidably moved laterally in unchanged orientation without rotation under the guidance of said guide projection by said oblique portion of said guideway.

2. A drawer unit according to claim 1, wherein said guide projection for supporting the rear portion of said drawer member is disposed for forward and rearward movement in said unit body along said guideway, and when said drawer member is drawn out forwardly farther than the front end of said unit body, said guide projection is moved forwardly together with said drawer member in said unit body in a leftward or rightward direction along said guideway.

3. A drawer unit according to claim 1, wherein said drawer member is removable from said unit body.

4. A drawer unit according to claim 1, wherein a pair of such guideways are formed on said unit body in such a manner that the oblique portions thereof extend obliquely outwardly away from each other and wherein said drawer member includes two divisional sections on each of which a guide projection inserted for sliding movement in a corresponding one of said guideways is provided, and when said drawer member is drawn out, it protrudes forwardly farther than the front end face of said unit body and said two divisional sections thereof are slidably moved outwardly away from each other.

5. A drawer unit according to claim 4, wherein said two divisional sections are independent sections, each individually movable.

6. A drawer unit according to claim 4 further comprising a receiving hole in each of said divisional sections.

7. A drawer unit according to claim 6 further comprising a horizontal bar segment mounted below each receiving hole.

8. A drawer unit according to claim 5 further comprising a receiving hole in said drawer member.

9. A drawer unit according to claim 8 further comprising a horizontal bar segment mounted below each receiving hole.

10. A drawer unit according to claim 1, wherein said guideway is formed on a bottom wall of said unit body.

11. A drawer unit according to claim 10, wherein said guide projection projects downward from a lower surface of said drawer member.

* * * * *